(12) United States Patent
Knight, Jr. et al.

(10) Patent No.: US 7,925,001 B2
(45) Date of Patent: Apr. 12, 2011

(54) METHODS AND APPARATUS FOR CONTACT CENTER AGENT SELECTION

(75) Inventors: James Lee Knight, Jr., Matawan, NJ (US); Rodney Allen Thomson, Westminster, CO (US); William Vincent McGuire, Westford, MA (US); Kevin J. Mendel, Groton, MA (US); Anita Marie Tarantino, Pepperell, MA (US)

(73) Assignee: Avaya Inc., Basking Ridge, NJ (US)

( * ) Notice: Subject to any disclaimer, the term of this patent is extended or adjusted under 35 U.S.C. 154(b) by 1176 days.

(21) Appl. No.: 11/603,469

(22) Filed: Nov. 22, 2006

(65) Prior Publication Data

US 2009/0110182 A1 Apr. 30, 2009

(51) Int. Cl.
*H04M 3/00* (2006.01)
*H04M 5/00* (2006.01)

(52) U.S. Cl. .......... 379/265.01; 379/265.05; 379/265.06

(58) Field of Classification Search .................. 379/265, 379/265.06, 265.05, 265.01, 265.08
See application file for complete search history.

(56) References Cited

U.S. PATENT DOCUMENTS

| | | | |
|---|---|---|---|
| 5,828,747 A | 10/1998 | Fisher et al. | 379/309 |
| 6,163,607 A | 12/2000 | Bogart et al. | 379/266 |
| 6,453,038 B1 | 9/2002 | McFarlane et al. | 379/265.05 |
| 2002/0080950 A1* | 6/2002 | Koko et al. | 379/265.06 |
| 2007/0133781 A1* | 6/2007 | Febonio et al. | 379/265.05 |

* cited by examiner

*Primary Examiner* — Thjuan K Addy
(74) *Attorney, Agent, or Firm* — Chapin IP Law, LLC; David W. Rouille, Esq.

(57) ABSTRACT

A system receives a request for the service. The system selects an agent to deliver the service, based on an evaluation of the agent. In response to the request for service, the system evaluates the service delivered by the agent after the agent has delivered the service, and updates the evaluation of the service of the agent.

21 Claims, 8 Drawing Sheets

208 SELECT THE AGENT TO DELIVER THE SERVICE, BASED ON AN EVALUATION OF THE AGENT

> 209 DETERMINE A MANNER OF PROVIDING THE SERVICE SUCH THAT THE SERVICE SATISFIES THE REQUEST

OR

> 210 SELECT THE AGENT FROM A COLLECTION OF AGENTS, THE COLLECTION OF AGENTS INCLUDED IN A PLURALITY OF COLLECTIONS OF AGENTS
>
> > 211 COMPILE THE PLURALITY OF COLLECTIONS OF AGENTS BASED ON AT LEAST ONE OF:
> > i) THE EVALUATION OF THE AGENTS WITHIN THE PLURALITY OF COLLECTIONS OF AGENTS, AND
> > ii) A REQUIREMENT OF THE CALL CENTER
> >
> > 212 ASSESS THE AGENTS WITHIN THE PLURALITY OF COLLECTIONS OF AGENTS, BASED ON A RANKING OF AT LEAST ONE AGENT WITH RESPECT TO OTHER AGENTS WITHIN A COLLECTION OF AGENTS

*FIG. 5*

213 EVALUATE THE SERVICE DELIVERED BY THE AGENT AFTER THE AGENT HAS DELIVERED THE SERVICE, IN RESPONSE TO THE REQUEST FOR SERVICE

214 EVALUATE A PERFORMANCE OF THE AGENT DURING DELIVERY OF THE SERVICE

215 SCALE AN EVALUATION OF THE PERFORMANCE OF THE AGENT BASED ON THE COLLECTION OF AGENTS IN WHICH THE AGENT IS INCLUDED

OR

216 PROMPT A MANAGER TO PERFORM A REVIEW OF THE AGENT BASED ON AN ASSESSMENT OF THE AGENT

217 PROMPT THE MANAGER TO PARTICIPATE IN A FUTURE DELIVERY OF SERVICE BY THE AGENT

218 PROMPT THE MANAGER TO PARTICIPATE, IN A FUTURE DELIVERY OF SERVICE BY THE AGENT, AT A FREQUENCY DEPENDENT ON THE ASSESSMENT OF THE AGENT

*FIG. 6*

224 EVALUATE THE SERVICE DELIVERED BY THE AGENT AFTER THE AGENT HAS DELIVERED THE SERVICE, IN RESPONSE TO THE REQUEST FOR SERVICE

225 ASSESS AT LEAST ONE ATTRIBUTE OF THE AGENT INCLUDING AT LEAST ONE OF:
i) A SPEED IN WHICH THE AGENT SATISFIED THE REQUEST
ii) A TERM OF SERVICE ASSOCIATED WITH THE AGENT
iii) A WEIGHTING OF A CATEGORY ASSOCIATED WITH THE REQUEST
iv) AN ASSESSMENT OF A CUSTOMER SOLICITING THE REQUEST
v) AN AMOUNT OF TRAINING THE AGENT HAS COMPLETED, AND
vi) AN AMOUNT OF AVAILABLE TRAINING THE AGENT IS QUALIFIED TO RECEIVE
vii) AN AMOUNT OF REVENUE GENERATED BY THE SERVICE DELIVERED BY THE AGENT
viii) AN AMOUNT OF COST SAVINGS PROVIDED BY THE SERVICE DELIVERED BY THE AGENT

OR

226 PROVIDE AT LEAST ONE BENEFIT TO THE AGENT, THE BENEFIT BASED ON THE SERVICE PROVIDED BY THE AGENT

227 MOVE THE AGENT FROM A FIRST COLLECTION OF AGENTS TO A SECOND COLLECTION OF AGENTS

OR

228 PROVIDE AN AMOUNT OF AVAILABLE TRAINING TO THE AGENT

*FIG. 8*

METHODS AND APPARATUS FOR CONTACT CENTER AGENT SELECTION

BACKGROUND

Contact centers employ agents to interact with customers. Historically, these interactions were via phone calls. However, today these interactions may be based on many other technical modalities including email, real-time web chat, video, fax, Short Message Service (SMS), physical mail and multi-modal combinations of these. Consequently, "Call centers" have become generalized to "Contact Centers" (that still include the phone-based voice modality).

Conventional contact center technologies assign and route those customer contacts to a contact center agent based on the needs of the customer, the customer's interaction history (i.e., whether the current interaction is related to a previous one), and the availability of an appropriate agent. Contact centers typically have groups of agents that handle different contact content areas and/or modality. For example, there may be one group of agents that handles sales inquiries, another group that handles customer complaints, and yet another group that handles billing questions. In some contact center implementations, agent groups (commonly called "splits") are replaced by sets of agents with all agents in a set having a common skill attribute (such as accounting expertise, for example.) Since agents typically possible multiple skills, they may be simultaneously in multiple agent skill sets. Agents can be moved manually from one group to another (or added to another) to a new group (or, equivalently, by having the agent's new skill entered in the contact center's agent database) by contact center managers utilizing a software administration function. Managers can reassign agents to different groups manually (guided by contact center data reports) based on changes in the contact center's staffing needs, performance and/or changes in the agents' abilities.

SUMMARY

Conventional technologies for selecting agents to handle customer contacts within a contact center suffer from a variety of deficiencies. In particular, conventional technologies that select agents to handle contacts are limited in that automated call routing systems route contacts to agent groups (i.e., sales, customer service, billing, etc.) whose constituents are manually assigned (by a contact center manager) and whose constituents are considered to have essentially identical, static attributes. Typically these agent attributes are related to the group's purpose—for example, an agent in a "Billing Questions" group may have specialized training or skill in accessing and utilizing the company's billing records system. Within a group, the level of agent skill or experience in handling a particular type of customer contact is static (over periods on the order of weeks or longer, and are certainly so during a workday) and is assumed to be equivalent to any that of any other agent who is in the same group or who is designated to possess the same skill attribute.

Call routing systems may have a contact center employee, such as a manager, who manually assigns agents to groups or updates agents training and performance records. This is not an automated process and is therefore costly, and may not be done in a timely way.

Embodiments disclosed herein significantly overcome such deficiencies and provide a system that includes a computer system executing an agent selecting process that receives a call at a contact center, and selects the best agent, based on the attributes associated with the agent (such as performance evaluations, length of service, etc.). The agent selecting process continuously updates the attributes associated with the agents, and uses that updated information to select the best agent for each new incoming call. When the agent selecting process receives an incoming call from a customer, the agent selecting process may evaluate the customer, for example, using speech recognition technology, to determine the emotional state of the customer (for example, if the customer is irate). The agent selecting process then would select an agent that has a demonstrated performance of being successful at appeasing irate customers. The agent selecting process also determines the best manner of providing that service to the customer.

The agents are grouped according to at least one attribute associated with the agent, such as an evaluation of the agent's performance, length of service with the contact center, etc. For example, a new agent who has only worked at the contact center for one month may be grouped with other beginner agents. An agent, who has worked at the contact center for one year, and has demonstrated proficiency at handling customer complaints, may be grouped with other more experienced agents. Within the groupings, the agents are ranked further still, with respect to the other agents within that group. The agent selecting process may further group the agents according to the requirements of the contact center. For example, during the weeks before Christmas, the contact center may need additional agents in the sales groups whereas after Christmas, that increased demand may switch from the sales groups to the billing groups.

The agent selecting process evaluates the performance, and other attributes of the agent during the call with the customer. For example, the agent selecting process may move the agent from a beginner group to an intermediate group once the agent has performed one hundred hours of services handling customer calls. As the agent is handling customer calls, the agent selecting process assesses the length of service the agent has performed, the type of customer calls (i.e., sales, customer service, billing, etc.). When the agent completes a requirement (such as completing one hundred hours of service handling customer calls), the agent selecting process moves the agent to the appropriate group. In an example embodiment, the agent selecting process scales the evaluation of the performance of the agent such that it becomes more and more difficult for an agent to move to a more experienced group.

In an example embodiment, the agent selecting process also prompts a contact center employee, such as a manager, to perform a review of the agent based on an assessment. For example, the agent selecting process may detect that an agent is not handling customer calls efficiently. The agent selecting process may notify the agent's manager that the agent's performance needs further review. The agent selecting process may even suggest that the manager listen in on the agent's calls to determine the source of the problem. In an example embodiment, the agent selecting process automatically selects those agents' calls that the manager should listen in on. The agent selecting process selects the frequency at which a manager should listen in on an agent's customer calls, based on the agent selecting process's assessment of that agent. In other words, a manager needs to listen in on a call intermittently when the agent has occasional problems handling customer calls. However the agent selecting process determines that the manager needs to listen in on calls more frequently when an agent is consistently failing to successfully complete the customer call.

In an example embodiment, the agent selecting process performs evaluations of the agents based on policies associated with the contact center. For example, a contact center may have a policy that defines spending five minutes on a call with a customer as an example of good customer service. The agent selecting process also allows a manager to modify that policy. For example, during high call volume periods, the manager may need to reduce that time spent on each customer call from five minutes to three minutes. The manager can manually modify the policy. In response to the manager modifying the policy, the agent selecting process performs a new evaluation of all the agents. The agent selecting process also allows the manager to override the evaluation of any existing policy. For example, the contact center's policy may require that agents complete six months of service before being qualified to handle customer complaints. On a high volume call day, the manager may require additional staff to handle customer complaints, even if that means that agents with less than six months of service are handling customer complaints. The agent selecting process allows the manager to override the 'six months of required service' policy to meet the contact center's needs.

The agent selecting process evaluates the service of each agent based on a variety of attributes including the speed in which the agent handles customer calls, the length of service associated with the agent, etc. The agent selecting process also weights different groups of agents. For example, handling customer complaint calls is more difficult than handling billing complaints. Therefore, when evaluating an agent, the agent selecting process weights the length of service in the customer complaint department more than the length of service handling customer calls in the billing department. The agent selecting process groups the agent based on the evaluation. As agents are categorized in different groups, those agents receive various benefits, such as being eligible for additional training. The agent selecting process keeps track of the training available to an agent, as well as the training the agent has completed.

The agent selecting process receives a request for the service, and selects the agent to deliver the service, based on an evaluation of the agent. In response to the request for service, the agent selecting process evaluates the service delivered by the agent, after the agent has delivered the service. The agent selecting process then updates the evaluation of the service of the agent.

The term "Contact" is used to mean any interaction with a customer, regardless of modality (or set of modalities.) Contacts may be incoming—initiated by the customer—or outgoing, as in telemarketing, initiated by the contact center's equipment and then assigned or delivered to an agent. As disclosed herein, incoming and outgoing customer contacts are equivalent and are both subsumed within the term "Contact." Embodiments disclosed herein are applicable to both traditional group/split-based contact centers (in which agents are assigned to specific defined groups—such as a "Billing Question Group") as well as to skill-based contact centers in which agents belong to skill sets on the basis of their known and fixed ability attributes. The term "Group" is used herein to refer to a collection of agents, whether a group, split or common skill attribute, as disclosed herein.

During an example operation of one embodiment, suppose a manager, using the agent selecting process, runs a report to assess the staff of contact center agents. The agent selecting process automatically classifies the agents into groups according to, for example, length of service. For example, the groupings are beginner agents (i.e., zero to six months of service at the contact center), intermediate agents (i.e., six to twelve months of service at the contact center), and experienced agents (i.e., greater than twelve months of service at the contact center). Within those groupings, the agent selecting process further groups the agents according to, for example, proficiency within the groups. An agent, in the experienced agent group, may have significantly more experience (i.e., number of hours) successfully handling customer service calls than other agents within the experienced agents group. The agent selecting process ranks that agent as more experienced than the other agents within the experienced agent group. When a customer service call comes in from a customer associated with a high value account, the agent selecting process selects the most experienced agent within the experienced agent group to handle that customer's call.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Avaya Inc. of Lincroft, N.J.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1, when the agent selecting process selects the agent to deliver the service, based on an evaluation of the agent, according to one embodiment disclosed herein.

FIG. 6 illustrates a flowchart of a procedure performed by the system of FIG. 1, when the agent selecting process evaluates the service delivered by the agent after the agent has delivered the service, in response to the request for service, according to one embodiment disclosed herein.

FIG. 8 illustrates a flowchart of a procedure performed by the system of FIG. 1, when the agent selecting process evaluates the service delivered by the agent after the agent has delivered the service, and assesses at least one attribute of the agent, according to one embodiment disclosed herein.

DETAILED DESCRIPTION

Figure 1:
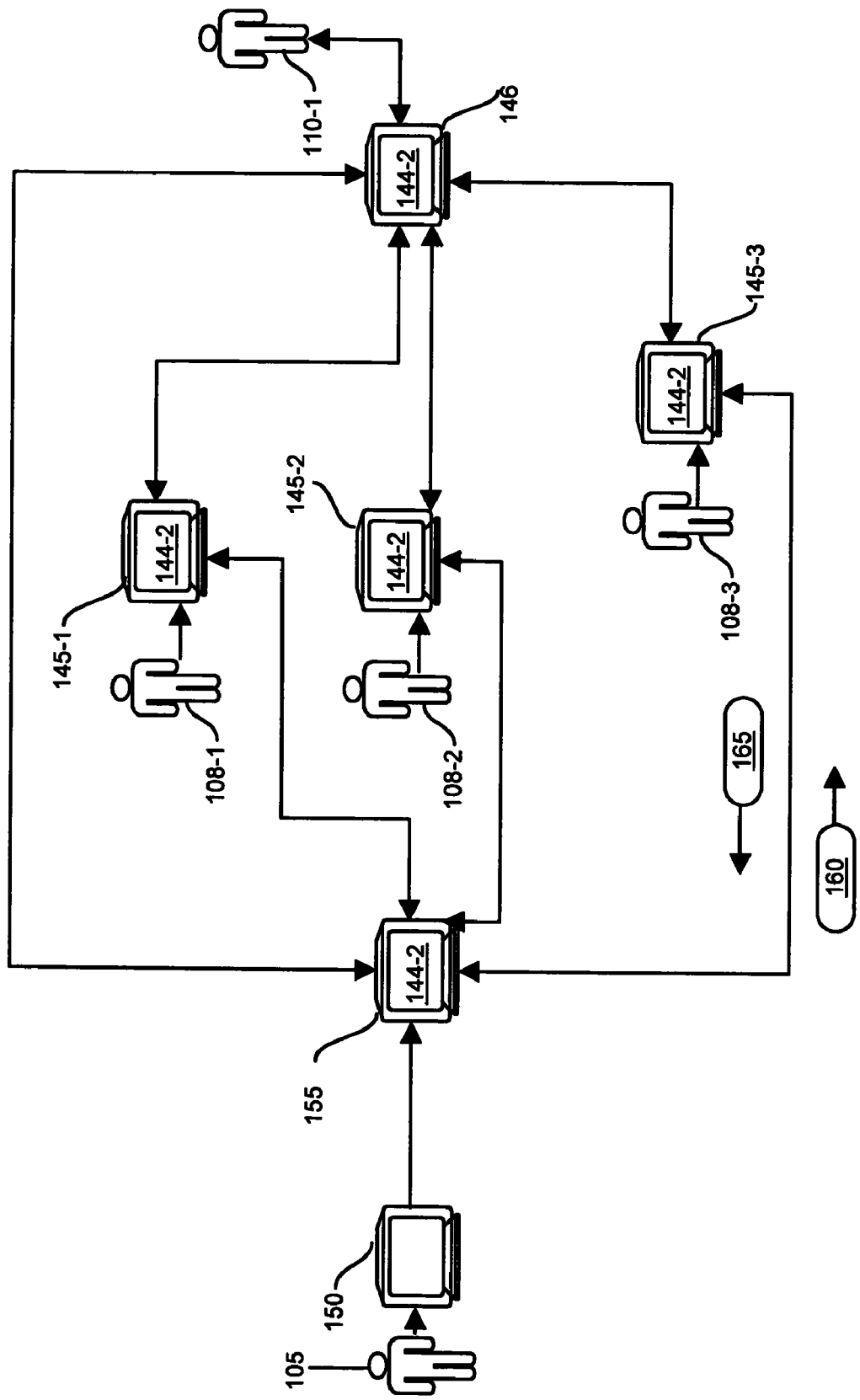
FIG. 1 shows a high level view of a system executing an agent selecting process according to one embodiment disclosed herein.

Embodiments disclosed herein include an agent selecting process that receives a call at a contact center, and selects the best agent, based on the attributes associated with the agent (such as performance evaluations, length of service, etc.). The agent selecting process continuously updates the attributes associated with the agents, and uses that updated information to select the best agent for each new incoming call. When the agent selecting process receives an incoming call from a customer, the agent selecting process may evaluate the customer, for example, using speech recognition technology, to determine the customer emotional state of the customer (for example, if the customer is irate). The agent selecting process then would select an agent that has a demonstrated performance of being successful at appeasing irate customers. The agent selecting process also determines the best manner of providing that service to the customer.

The agents are grouped according to at least one attribute associated with the agent, such as an evaluation of the agent's performance, length of service with the contact center, etc. For example, a new agent who has only worked at the contact center for one month may be grouped with other beginner agents. An agent, who has worked at the contact center for one year, and has demonstrated proficiency at handling customer complaints, may be grouped with other more experienced agents. Within the groupings, the agents are ranked further still, with respect to the other agents within that group. The agent selecting process may further group the agents according to the requirements of the contact center. For example, during the weeks before Christmas, the contact center may need additional agents in the sales groups whereas after Christmas, that increased demand may switch from the sales groups to the billing groups.

The agent selecting process evaluates the performance, and other attributes of the agent during the call with the customer. For example, the agent selecting process may move the agent from a beginner group to an intermediate group once the agent has performed one hundred hours of services handling customer calls. As the agent is handling customer calls, the agent selecting process assesses the length of service the agent has performed, the type of customer calls (i.e., sales, customer service, billing, etc.). When the agent completes a requirement (such as completing one hundred hours of service handling customer calls), the agent selecting process moves the agent to the appropriate group. In an example embodiment, the agent selecting process scales the evaluation of the performance of the agent such that it becomes more and more difficult for an agent to move to a more experienced group.

In an example embodiment, the agent selecting process also prompts a contact center employee, such as a manager, to perform a review of the agent based on an assessment. For example, the agent selecting process may detect that an agent is not handling customer calls efficiently. The agent selecting process may notify the agent's manager that the agent's performance needs further review. The agent selecting process may even suggest that the manager listen in on the agent's calls to determine the source of the problem. In an example embodiment, the agent selecting process automatically selects those agents' calls that the manager should listen in on. The agent selecting process selects the frequency at which a manager should listen in on an agent's customer calls, based on the agent selecting process's assessment of that agent. In other words, a manager needs to listen in on a call intermittently when the agent has occasional problems handling customer calls. However the agent selecting process determines that the manager needs to listen in on calls more frequently when an agent is consistently failing to successfully complete the customer call.

In an example embodiment, the agent selecting process performs evaluations of the agents based on policies associated with the contact center. For example, a contact center may have a policy that defines spending five minutes on a call with a customer as an example of good customer service. The agent selecting process also allows a manager to modify that policy. For example, during high call volume periods, the manager may need to reduce that time spent on each customer call from five minutes to three minutes. The manager can manually modify the policy. In response to the manager modifying the policy, the agent selecting process performs a new evaluation of all the agents. The agent selecting process also allows the manager to override the evaluation of any existing policy. For example, the contact center's policy may require that agents complete six months of service before being qualified to handle customer complaints. On a high volume call day, the manager may require additional staff to handle customer complaints, even if that means that agents with less than six months of service are handling customer complaints. The agent selecting process allows the manager to override the 'six months of required service' policy to meet the contact center's needs.

The agent selecting process evaluates the service of each agent based on a variety of attributes including the speed in which the agent handles customer calls, the length of service associated with the agent, etc. The agent selecting process also weights different groups of agents. For example, handling customer complaint calls is more difficult than handling billing complaints. Therefore, when evaluating an agent, the agent selecting process weights the length of service in the customer complaint department more than the length of service handling customer calls in the billing department. The agent selecting process groups the agent based on the evaluation. As agents are categorized in different groups, those agents receive various benefits, such as being eligible for additional training. The agent selecting process keeps track of the training available to an agent, as well as the training the agent has completed.

The agent selecting process receives a request for the service, and selects the agent to deliver the service, based on an evaluation of the agent. In response to the request for service, the agent selecting process evaluates the service delivered by the agent, after the agent has delivered the service. The agent selecting process then updates the evaluation of the service of the agent.

Figure 2:
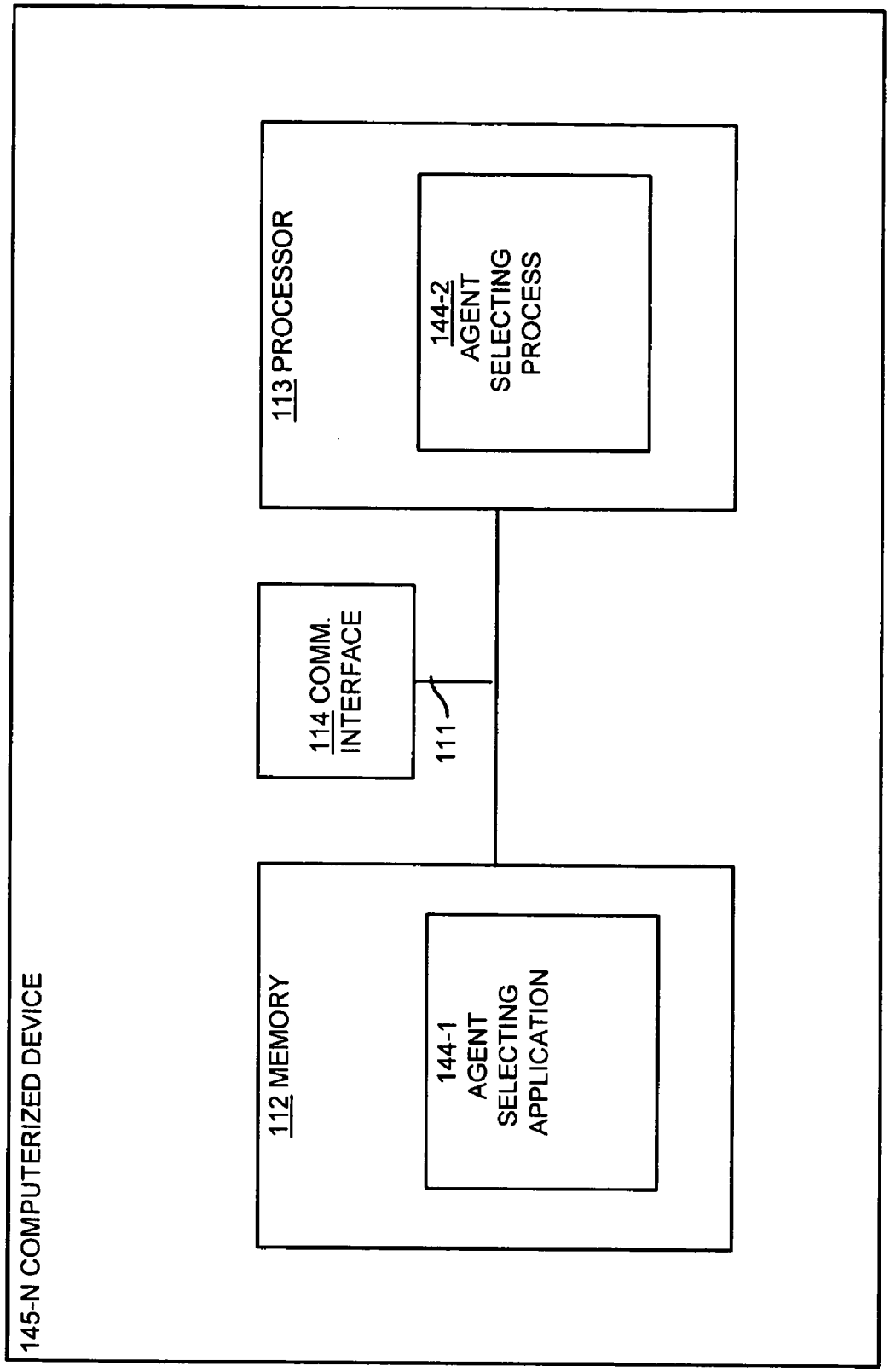
FIG. 2 shows a high-level block diagram of a computer system according to one embodiment disclosed herein.

FIG. 1 is an example high-level view of a system executing an agent selecting process 144-2 according to one embodiment disclosed herein. A customer 105, using a customer device 150, such as a computer system, contacts the contact center, via the contact center server 155 with a request 160 for service 165. The customer device 150 may be a computer system, telephone, etc. The contact center server 155, running an instance of the agent selecting process 144-2, is connected to a plurality of computer systems 145-N, including a manager computer system 146, each of which is also running an instance of the agent selecting process 144-2. Agents 108-N respond to requests 160-N via the computer systems 145-N. The agent selecting process 144-2 determines the best agent 108-N to handle the customer's 105 request 160. The agent selecting process 144-2 routes the request 160 to the selected agent 108-3. The agent 108-3 handles the request 160 using a computer system 145-3. The agent selecting process 144-2 determines the best manner of handling the customer's 105 request 160. That manner may be via email, instant message, voice over IP, etc. A manager 110-1 also operating a computer system 146 running an instance of the agent selecting process 144-2, monitors the agents 108-N as those agents 108-N provide a service 165 in response to a customer's 105 request 160. FIG. 2 explains further details of the computer systems 145-N running an instance of the agent selecting process 144-2.

FIG. 2 illustrates an example architecture of a computer system 145. The computer system 145 may be any type of computerized device such as a personal computer, workstation, portable computing device, console, laptop, network terminal or the like. In this example, the computer system 145 includes an interconnection mechanism 111 that couples a memory system 112, a processor 113, and a communications interface 114. The communications interface 114 enables the computer system 145 to communicate with other devices (i.e., other computers) on a network (not shown). This can allow access to the agent selecting application by remote computer systems.

The memory system 112 may be any type of computer readable medium that is encoded with an agent selecting application 144-1 that may be embodied as software code such as data and/or logic instructions (e.g., code stored in the memory or on another computer readable medium such as a removable disk) that supports processing functionality according to different embodiments described herein. During operation of the computer system 145, the processor 113 accesses the memory system 112 via the interconnect 111 in order to launch, run, execute, interpret or otherwise perform the logic instructions of the agent selecting application 144-1. Execution of agent selecting application 144-1 in this manner produces processing functionality in an agent selecting process 144-2. In other words, the agent selecting process 144-2 represents one or more portions of runtime instances of the agent selecting application 144-1 (or the entire application 144-1) performing or executing within or upon the processor 113 in the computerized system 145 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the content formatting process.

Figure 3:
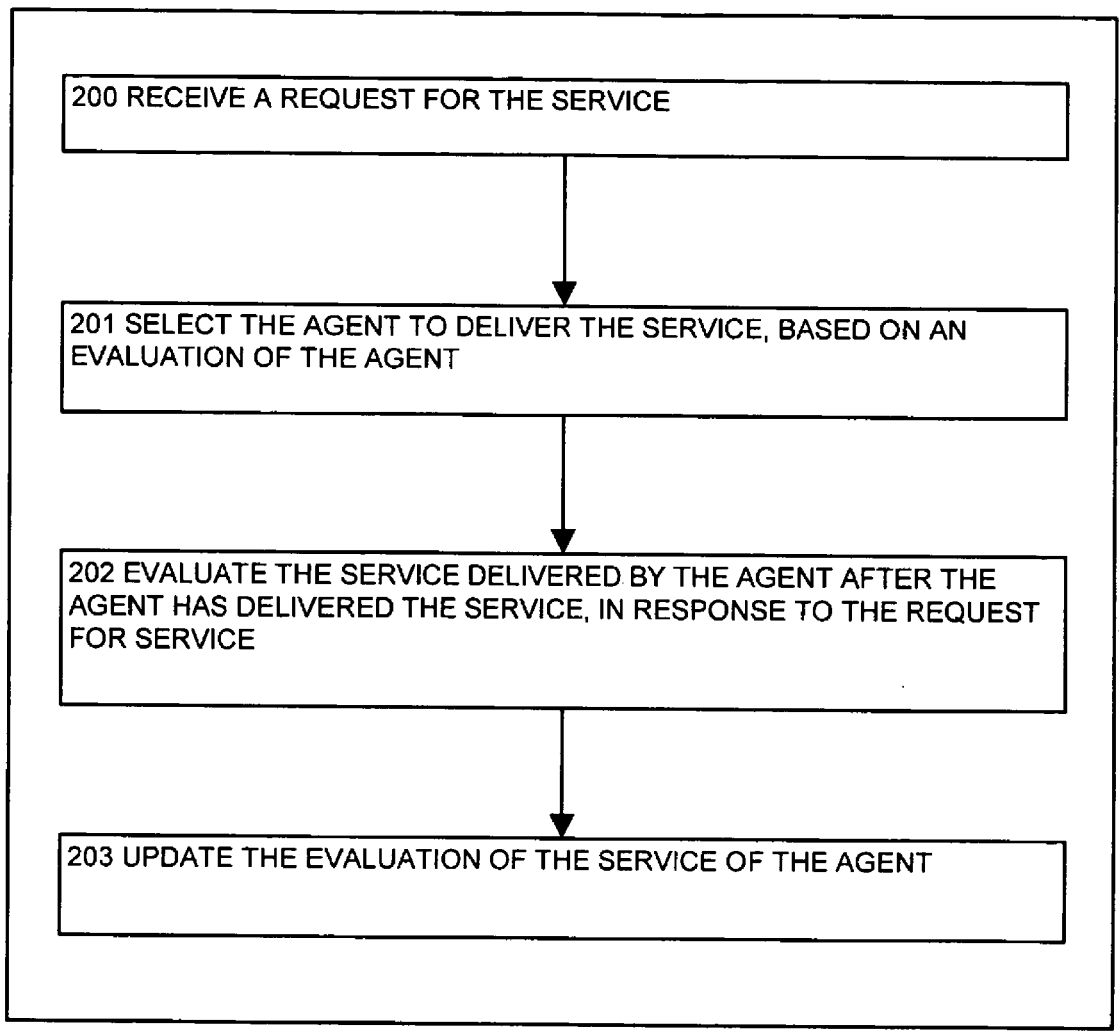
FIG. 3 illustrates a flowchart of a procedure performed by the system of FIG. 1, when the agent selecting process receives a request for the service, according to one embodiment disclosed herein.

FIG. 3 is an embodiment of the steps performed by the agent selecting process 144-2 when it receives a request 160 for the service 165.

In step 200, the agent selecting process 144-2 receives a request 160 for the service 165. A customer 105 may contact the contact center to receive a service 165 such has resolving a billing issue, filing a complaint, etc. The customer 105 may contact the contact center via a telephone, personal computerized device, computer system, etc.

In step 201, the agent selecting process 144-2 selects the agent 108-N to deliver the service 165, based on an evaluation of the agent 108-N. The agent selecting process 144-2 selects the best agent 108-N to provide the service 165 to the customer 105, based on the request 105, the customer 105, and the evaluation of the agent 108-N. For example, the customer 105 might not speak English, and therefore, requires an agent 108-N that speaks the same language as the customer 105. The customer 105 may be very angry concerning a customer service issue. In this scenario, the best agent 108-N to handle the customer's 105 complaint is an agent 108-N that is experienced in handling difficult customer 105 requests 160. The agent's 108-N accumulated experience is an attribute of the agent 108-N. For example, a customer service group can be defined to handle incoming customer service calls. Agents 108-N assigned to this group by the agent selecting process 144-2 inherit the attribute of customer service group agent 108-N. When moved out of this group, those agents 108-N would no longer have that attribute. However, "accumulated experience" (i.e., customer service group experience), and other attributes follow the agent 108-N. The specific pattern of agent 108-N experience could therefore be used in call routing policies (i.e., "Route to agent with most "disk drive problem group" experience but also weight "experience in Windows XP problems group" when selecting agent 108-N to handle a specific call.)

The agent selecting process 144-2 uses individual differences between agents 108-N within a group or with the same "skill" to select the most appropriate agent 108-1 to handle the customer's 105 request 160 for service. Agents 108-N are recognized as being individuals (i.e., not identical) for purposes of contact routing, reporting, performance ranking, etc. The agent selecting process 144-2 dynamically and automatically updates these individual differences among agents 108-N. The individual differences are weighted. For example, an agent 108-1 capable of handling 10 calls in the "Compliment" department group may be equivalent to another agent 108-3 capable of handling 4 calls in the "Complaint" department when the agent selecting process 144-2 directs a "complaint" call to an available agent 108-N in the "Complaint" group. The agent selecting process 144-2 updates agent's 108-N attributes at the completion of the call. These attributes (i.e., number of calls delivered to the agent 108-N, number of calls completed by the agent 108-N, amount of sales dollars earned by the agent 108-N, accumulated customer 105 satisfaction rating after each call, etc) are continually updated. The agent selecting process 144-2 automatically moves agents 108-N among groups, adds agents 108-N to new groups, updates agents' 108-N eligibility for new benefits or responsibilities, etc.

In response to the request 160 for service 165, in step 202, the agent selecting process 144-2 evaluates the service 165 delivered by the agent 108-N, after the agent 108-N has delivered the service 165. The agent selecting process 144-2 continuously and iteratively updates the evaluation of the agent 108-N, such that as each new customer 105 request 160 arrives at the contact center, the agent selecting process 144-2 uses the most current information (regarding the evaluations of the agents 108-N) to select the best agent 108-N to handle that request 160.

In step 203, the agent selecting process 144-2 updates the evaluation of the service 165 of the agent 108-N. At the completion of each customer 105 call, the agent selecting process 144-2 performs an evaluation of the service 165 provided by the agent 108-N, and updates the evaluation of the agent 108-N.

Figure 4:
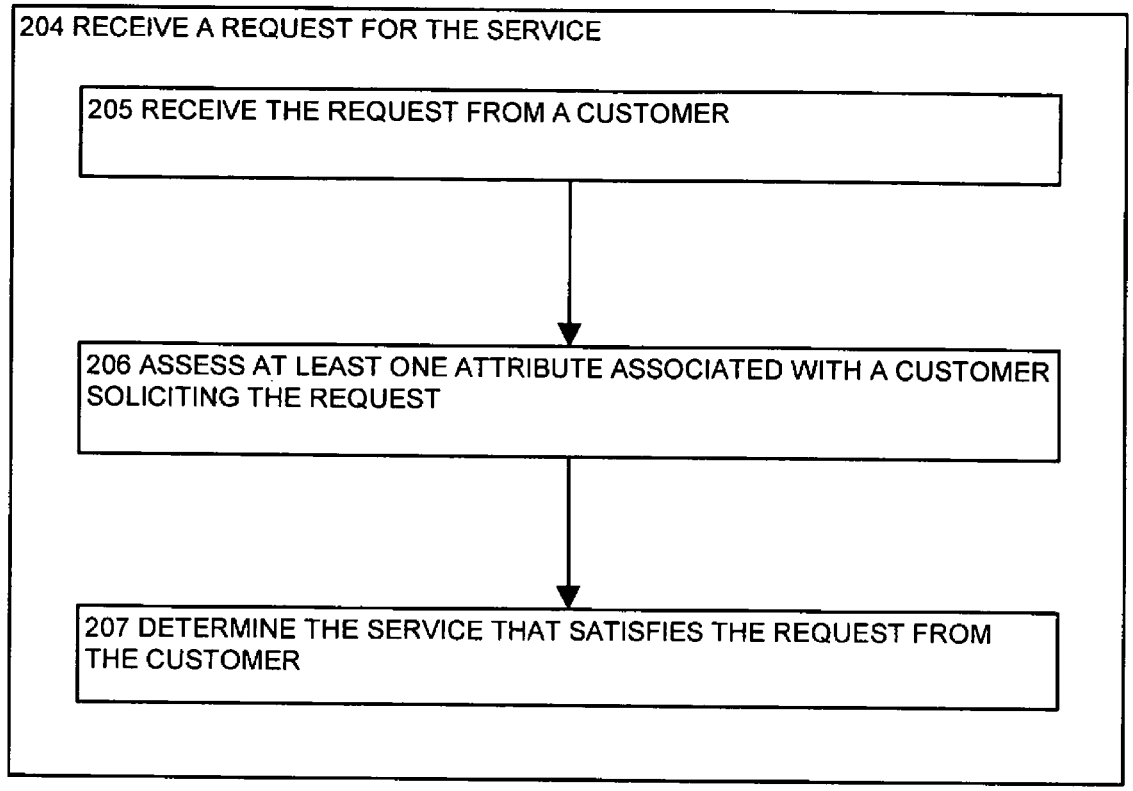
FIG. 4 illustrates a flowchart of a procedure performed by the system of FIG. 1, when the agent selecting process receives a request for the service from a customer, according to one embodiment disclosed herein.

FIG. 4 is an embodiment of the steps performed by the agent selecting process 144-2 when it receives a request 160 for the service 165.

In step 204, the agent selecting process 144-2 receives a request 160 for the service 165. The agent selecting process 144-2 utilizes information about both the customer 105 soliciting the request 160, as well as the evaluation of the agent 108-N to determine the best agent 108-N to provide the service 165 in response to the request 160.

In step 205, the agent selecting process 144-2 receives the request 160 from a customer 105. The contact center receives a request 160 for service 165 from a customer 105. The request 160 is received at the contact center server 155, running an instance of the agent selecting process 144-2. The agent selecting process 144-2 running on the contact center server 155 determines the best agent 108-N to handle the customer's 105 request 160, and routes the customer 105 to the selected agent 108-N.

In step 206, the agent selecting process 144-2 assesses at least one attribute associated with a customer 105 soliciting the request 160. Attributes associated with the customer 105 aid the agent selecting process 144-2 in determining the best agent 108-N to provide service 165 in response to the customer's 105 request 160. Attributes associated with the customer 105 may include the customer's 105 request 160 history, the customer's 105 purchase history, the language the customer 105 speaks, whether the customer 105 is angry, etc. In an example embodiment, voice recognition technology determines an emotional state of the customer 105 (i.e., calm, angry, etc.) and uses that attributes when selecting the best agent 108-N to provide service 165 to that customer 105.

In step 207, the agent selecting process 144-2 determines the service 165 that satisfies the request 160 from the customer 105. Based on the evaluation of the agent 108-N, an assessment of at least one attributes associated with the customer 105, and the request 160 solicited by the customer 105, the agent selecting process 144-2 determines the service 165 that satisfies the request 160 from the customer 105.

FIG. 5 is an embodiment of the steps performed by the agent selecting process 144-2 when it selects the agent 108-N to deliver the service 165, based on an evaluation of the agent 108-N.

In step 208, the agent selecting process 144-2 selects the agent 108-N to deliver the service 165, based on an evaluation of the agent 108-N. The agent selecting process 144-2 continuously, and iteratively evaluates the agents 108-N, as well as the requirements of the contact center (i.e., such as call volume, etc.). Using the evaluation of the agents 108-N, the agent selecting process 144-2 selects the best agent 108-N to deliver the service 165 in response to the request 160.

In step 209, the agent selecting process 144-2 determines a manner of providing the service 165 such that the service 165 satisfies the request 160. In an example embodiment, a customer 105 contacts the contact center with a request 160. The agent selecting process 144-2 determines the customer's 105 request 160 for service 165 is a complicated request 160. The agent selecting process 144-2 determines communicating with the customer 105 via the telephone would be the best manner of providing service 165 given the complex nature of the request 160. However, the agent selecting process 144-2 has determined one attribute of the customer 105 is that the customer 105 is hearing impaired. Therefore, the agent selecting process 144-2 determines the best manner of providing service 165 to the customer 105 is via an online chat. The agent selecting process 144-2 selects the most appropriate agent 108-2 for that customer 105, and suggests that the agent 108-2 respond to the customer's 105 request 160 for service by initiating an online chat.

Alternatively, in step 210, the agent selecting process 144-2 selects the agent 108-3 from a collection of agents 108-N. The collection of agents 108-N is included in a plurality of collections of agents 108-N. In an example embodiment, the contact center groups the agents 108-N according to departments (i.e., billing, sales, customer service, etc.), length of service, skill, etc. A collection of agents 108-N may include all the agents serving the billing department, for example. When a request 160 for service 165 from the billing department is received at the contact center, the agent selecting process 144-2 selects an agent 108-3 from the collection of agents 108-N that provide service 165 for the billing department. In another example embodiment, the agent selecting process 144-2 determines that all the agents 108-N within the billing department are assisting other customers 105 and 105-N, not shown. The agent selecting process 144-2 identifies an agent 108-2 from the customer service department who has significant previous experience in billing, and routes the customer 105 call to that agent 108-2.

In step 211, the agent selecting process 144-2 compiles the plurality of collections of agents 108-N based on at least one of:

i) The evaluation of the agents 108-N within the plurality of collections of agents 108-N. For example, a collection of agents 108-N may be grouped according to the skill level of the agents 108-N. The agent selecting process 144-2 may group beginner agents 108-N together in one collection of agents 108-N, while more experienced agents 108-N may be grouped together in a different collection of agents 108-N.

ii) A requirement of the contact center. For example, before a holiday, the contact center may require additional staffing in the sales department. The agent selecting process 144-2 evaluates the agents 108-N, determines which agents 108-N are qualified to provide service 165 in the sales department, and compiles a collection of agents 108-N to handle the increased demand in the sales department.

In step 212, the agent selecting process 144-2 assesses the agents 108-N within the plurality of collections of agents 108-N, based on a ranking of at least one agent 108-3, with respect to other agents 108-N within a collection of agents 108-N. Within each collection of agents 108-N, the agent selecting process 144-2 ranks an agent 108-3 with respect to the evaluations of other agents 108-N within that collection of agents 108-N.

The ranking of agents 108-N within each collection of agents 108-N enables the agent selecting process 144-2 to select the most appropriate agent 108-1 from the collection of agents 108-N for a particular request 160. For example, selecting the most experienced agent 108-1 in disk drive problems from the collection of experienced agents 108-N is preferable than selecting any agent 108-2 from the collection of experienced agents 108-N.

FIG. 6 is an embodiment of the steps performed by the agent selecting process 144-2 when it evaluates the service 165 delivered by the agent 108-3 after the agent 108-3 has delivered the service 165.

In response to the request 160 for service 165, in step 213, the agent selecting process 144-2 evaluates the service 165 delivered by the agent 108-3 after the agent 108-3 has delivered the service 165. The agent selecting process 144-2 evaluates the service 165 delivered by the agent 108-3 to obtain a variety of information. For example, at the completion of delivery of service 165 (i.e., handling a customer 105 request 160), the agent selecting process 144-2 adds the time the agent 108-3 spent on the call to the agent's 108-3 length of service. The time the agent 108-3 spent on the call is further dissected to include, for example, the area in which the agent 108-3 provided the service 165 (i.e., billing, sales, customer service, etc.), as well as specific information about the request 160, such as the emotional state of the customer 105 (i.e., was the customer 105 call a 'difficult', or 'easy' request 160).

In step 214, the agent selecting process 144-2 evaluates a performance of the agent 108-3 during delivery of the service 165. The agent selecting process 144-2 assesses the performance of the agent 108-3 providing the service 165. For example, the agent selecting process 144-2 may determine that spending twenty minutes on a customer 105 call, and then having to transfer that call to a manager 110-1, is indicative of poor performance.

In step 215, the agent selecting process 144-2 scales an evaluation of the performance of the agent 108-3 based on the collection of agents 108-N in which the agent 108-3 is included. In an example embodiment, the qualifications to move from one collection of agents 108-N to a higher collection of agents 108-N become increasingly more difficult to achieve.

Alternatively, in step 216, the agent selecting process 144-2 prompts a manager 110-1 to perform a review of the agent 108-3 based on an assessment of the agent 108-3. In an example embodiment, the agent selecting process 144-2 determines that the agent 108-3 has been performing poorly. The agent selecting process 144-2 notifies the agent's 108-3 manager 110-1 of the agent's 108-3 poor performance, and recommends that the manager 110-1 investigate further the reasons for the poor performance.

In step 217, the agent selecting process 144-2 prompts the manager 110-1 to participate in a future delivery of service 165 by the agent 108-3. The agent selecting process 144-2 provides the ability for a manager 110-1 to listen in on calls involving the agent 108-3 as the agent 108-3 is delivering service 165. Upon determining the agent 108-3 is performing poorly, the agent selecting process 144-2 prompts the manager 110-1 to perform a review of the agent 108-3, and recommends that the manager 110-1 listen in on future calls where the agent 108-3 is providing service 165 for a customer 105.

In step 218, the agent selecting process 144-2 prompts the manager 110-1 to participate in a future delivery of service 165 by the agent 108-3. The frequency of participation is dependent on the assessment of the agent 108-3. The manager 110-1 has a limited capacity to listen in on agents' 108-N calls. The frequency of participation is inversely proportional the assessment of the agent 108-3. In other words, the lower the performance assessment of the agent 108-3 by the agent selecting process 144-2, the more the agent selecting process 144-2 will prompt the manager 110-1 to listen in on the agent's 108-3 calls.

Figure 7:
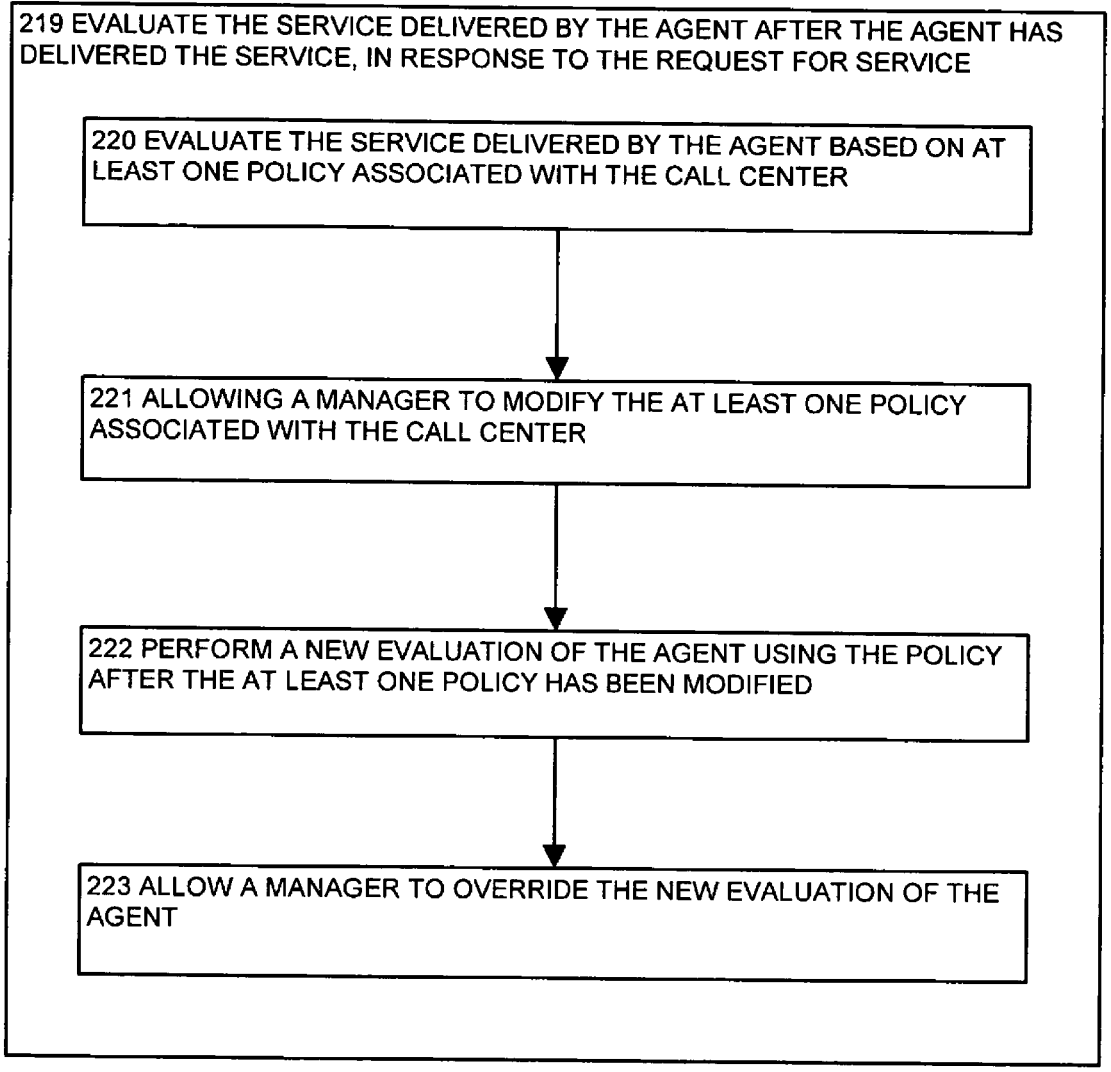
FIG. 7 illustrates a flowchart of a procedure performed by the system of FIG. 1, when the agent selecting process evaluates the service delivered by the agent based on at least one policy associated with the contact center, according to one embodiment disclosed herein.

FIG. 7 is an embodiment of the steps performed by the agent selecting process 144-2 when it evaluates the service 165 delivered by the agent 108-3 after the agent 108-3 has delivered the service 165.

In response to the request 160 for service 165, in step 219, the agent selecting process 144-2 evaluates the service 165 delivered by the agent 108-3 after the agent 108-3 has delivered the service 165. The contact center can specify policies associated with the contact center, such as "If a customer 105 is on hold more than five minutes, give the customer 105 the option of leaving voicemail for the selected agent 108-3".

In step 220, the agent selecting process 144-2 evaluates the service 165 delivered by the agent 108-3, based on at least one policy associated with the contact center. The policies associated with the contact center can include rules that determine the grouping of the collections of agents 108-N, evaluating the service 165 provided by the agents 108-N, evaluating the performance of the agents 108-N providing the service 165, selecting the best agent 108-3 to provide the service 165, etc.

In step 221, the agent selecting process 144-2 allows a manager 110-1 to modify at least one policy associated with the contact center. The agent selecting process 144-2 allows a manager 110-1 to modify at least one policy associated with the contact center. For example, a manager 110-1 determines the contact center is short staffed for the day. The agent selecting process 144-2 allows the manager 110-1 to modify the policies such that there are enough agents 108-N in high demand call areas to handle the volume of requests 160-N.

In step 222, the agent selecting process 144-2 performs a new evaluation of the agent 108-3 using the policy after at least one policy has been modified. In an example embodiment, a manager 110-1 modifies a policy. The agent selecting process 144-2 re-evaluates the agents 108-N according to the new policy. For example, the manager 110-1 modifies the policy that requires agents 108-N to have at least six months of service prior to being placed in a collection of intermediate experienced agents 108-N. Due to the demands of the contact center, the manager 110-1 modifies the policy such that agents 108-N having at least five months of service are grouped in the collection of intermediate experienced agents 108-N. The agent selecting process 144-2 re-evaluates the agents 108-N and groups those agents 108-N having at least five months of service in the collection of intermediate experienced agents 108-N.

In step 223, the agent selecting process 144-2 allows a manager 110-1 to override the new evaluation of the agent 108-3. In an example embodiment, the manager 110-1 modifies a policy and the agent selecting process 144-2 re-evaluates the agents 108-N according to the modified policy. The manager 110-1 overrides the re-evaluation, for example, removing an agent 108-3, from the collection of intermediate experienced agents 108-N, due to the agent's 108-3 prior history of poor performance.

FIG. 8 is an embodiment of the steps performed by the agent selecting process 144-2 when it evaluates the service 165 delivered by the agent 108-3, after the agent 108-3 has delivered the service 165.

In response to the request 160 for service 165, in step 224, the agent selecting process 144-2 evaluates the service 165 delivered by the agent 108-3, after the agent 108-3 has delivered the service 165. The agent selecting process 144-2 evaluates the service 165 provided by the agent 108-3, as well as the performance of the agent 108-3 in delivering the service 165. The agent selecting process 144-2 evaluates the service 165 provided by the agent 108-3, for example, to determine if the service 165 satisfied the customer's 105 request 160.

In step 225, the agent selecting process 144-2 assesses at least one attribute of the agent 108-3 including at least one of:

i) A speed in which the agent 108-3 satisfied the request 160. In an example embodiment, the agent selecting process 144-2 evaluates the speed in which the agent 108-3 satisfied the request 160, according to a policy associated with the contact center.

ii) A term of service associated with the agent 108-3. The term of service can include, for example, the length of time the agent 108-3 has worked at the contact center, prior history working at another contact center, the department in which the agent 108-3 has worked, etc.

iii) A weighting of a category associated with the request 160. In an example embodiment, the agent selecting process 144-2 weights the term of service of the agent 108-3 based on categories in which the agent 108-3 has provided that service. For example, one month working in a 'difficult' department, such as customer complaints may be weighted more than working three months in an 'easy' department such as the change of address department. The weighting of the different categories is factored into the agent selecting process's 144-2 evaluation of the agent 108-3.

iv) An assessment of a customer 105 soliciting the request 160. The agent selecting process 144-2 assesses the customer 105 to determine, for example, an emotional state of the customer 105 (i.e., calm, angry, etc). The assessment of the customer 105 may be factored into the evaluation of the agent 108-3. The agent selecting process 144-2 may also assess the customer 105 as a high value account customer 105, and factor this into the evaluation of the agent 108-3 (i.e., how well the agent 108-3 satisfies the requests 160 of high value customers 105).

v) An amount of training the agent 108-3 has completed.

vi) An amount of available training the agent 108-3 is qualified to receive. As the agent selecting process 144-2 moves the agent 108-3 into different collections of agents 108-N, the agent 108-3 qualifies to take additional training. The agent selecting process 144-2 tracks the training the agent 108-3 has qualified to received as well as the training the agent 108-3 has completed.

vii) An amount of revenue generated by the service delivered by the agent 108-3. The amount of revenue may be a sale generated by the agent 108-3, an up-sell, etc.

viii) An amount of cost savings provided by the service delivered by the agent 108-3. For example, a customer 105 may call the contact center to return a product. By instructing the customer 105 on the proper usage of the product, the customer 105 decides against returning the product, and the agent 108-3 has provided a cost savings to the contact center.

Alternatively, in step 226, the agent selecting process 144-2 provides at least one benefit to the agent 108-3. The benefit is based on the service 165 provided by the agent 108-3. In an example embodiment, the benefit might be additional time off, additional training, higher pay, moving the agent 108-3 to a higher collection of agents 108-N, etc.

In step 227, the agent selecting process 144-2 moves the agent 108-3 from a first collection of agents 108-N to a second collection of agents 108-N. At the completion of the agent 108-3 providing service 165, the agent selecting process 144-2 evaluates the agent 108-3, and, in an example embodiment, determines the agent 108-3 has qualified to be moved to a higher collection of agents 108-N. The agent selecting process 144-2 then moves the agent 108-3 to that higher collection of agents 108-N, and removes the agent from the lower collection of agents 108-N where the agent 108-3 was previously grouped.

In step 228, the agent selecting process 144-2 provides an amount of available training to the agent 108-3. As the agent 108-3 moves to higher collections of agents 108-N, the agent 108-3 qualifies to receive benefits, such as additional training. The agent selecting process 144-2 provides the amount of training such that the agent 108-N is informed when that agent 108-3 has qualified for the additional training.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method comprising:

receiving, at a contact center, a request for a service, the request received from a customer;

assessing at least one attribute associated with the customer requesting the service;

automatically classifying agents based on attributes including length of service and performance evaluations;

compiling a plurality of collections of agents based on respective attributes of the agents within the plurality of collections of agents, and based on a requirement of the contact center;

selecting an agent to deliver the service, based on an evaluation of the agent, including selecting the agent from a collection of agents, the collection of agents included in the plurality of collections of agents;

evaluating the service delivered by the agent after the agent has delivered the service, in response to the request for service; and updating the evaluation of the service of the agent.

2. The method of claim 1 further comprising:

assessing the agents within the plurality of collections of agents, based on a ranking of at least one agent with respect to other agents within a collection of agents;

identifying that the customer requesting the service is a customer associated with a high value account;

selecting a most experienced agent within an experienced agent group to provide the requested service; and wherein selecting the agent to deliver the service, based on an evaluation of the agent, comprises determining a manner of providing the service such that the service satisfies the request.

3. The method of claim 1 wherein evaluating the service delivered by the agent after the agent has delivered the service, in response to the request for service comprises:

evaluating a performance of the agent during delivery of the service.

4. The method of claim 3 further comprising:

scaling an evaluation of the performance of the agent based on the collection of agents in which the agent is included, to increase a difficulty to move a given agent from a less-experienced group to a more experienced group.

5. The method of claim 3 further comprising:
prompting a manager to perform a review of the agent based on an assessment of the agent;
wherein prompting a manager to perform the review of the agent based on the assessment of the agent comprises:
prompting the manager to participate in a future delivery of service by the agent; and
wherein prompting the manager to participate in a future delivery of service by the agent comprises:
prompting the manager to participate, in a future delivery of service by the agent, at a frequency dependent on the assessment of the agent.

6. The method of claim 5 wherein prompting the manager to participate in a future delivery of service by the agent comprises:
prompting the manager to participate, in a future delivery of service by the agent, at a frequency dependent on the assessment of the agent.

7. The method of claim 1 further comprising:
wherein evaluating the service delivered by the agent after the agent has delivered the service, in response to the request for service comprises:
evaluating the service delivered by the agent based on at least one policy associated with the contact center;
allowing a manager to modify the at least one policy associated with the contact center; and
performing a new evaluation of the agent using the policy after the at least one policy has been modified.

8. The method of claim 7 further comprising:
allowing a manager to override the new evaluation of the agent.

9. The method of claim 1 wherein evaluating the service delivered by the agent after the agent has delivered the service, in response to the request for service comprises:
assessing at least one attribute of the agent including at least one of:
i) a speed in which the agent satisfied the request;
ii) a term of service associated with the agent;
iii) a weighting of a category associated with the request;
iv) an assessment of a customer soliciting the request;
v) an amount of training the agent has completed;
vi) an amount of available training the agent is qualified to receive;
vii) an amount of revenue generated by the service delivered by the agent; and
viii) an amount of cost savings provided by the service delivered by the agent.

10. The method of claim 1 wherein evaluating the service delivered by the agent after the agent has delivered the service, in response to the request for service comprises:
providing at least one benefit to the agent, the benefit based on the service provided by the agent, wherein providing the at least one benefit to the agent, the benefit based on the service provided by the agent, comprises:
moving the agent from a first collection of agents to a second collection of agents; and
providing an amount of available training to the agent.

11. A computerized device comprising:
a memory;
a processor;
a communications interface;
an interconnection mechanism coupling the memory, the processor and the communications interface;
wherein the memory is encoded with an agent selecting application that when executed on the processor causes the processor to perform the operations of:
receiving, at a contact center, a request for a service, the request received from a customer;
assessing at least one attribute associated with the customer requesting the service;
automatically classifying agents based on attributes including length of service and performance evaluations;
compiling a plurality of collections of agents based on respective attributes of the agents within the plurality of collections of agents, and based on a requirement of the contact center;
selecting an agent to deliver the service, based on an evaluation of the agent, including selecting the agent from a collection of agents, the collection of agents included in the plurality of collections of agents;
evaluating the service delivered by the agent after the agent has delivered the service, in response to the request for service; and
updating the evaluation of the service of the agent.

12. A non-transitory computer readable medium encoded with computer programming logic that when executed on a processor in a computerized device causes the processor to select an agent, the medium comprising:
instructions for receiving, at a contact center, a request for a service, the request received from a customer;
instructions for assessing at least one attribute associated with the customer requesting the service;
instructions for automatically classifying agents based on attributes including length of service and performance evaluations;
instructions for compiling a plurality of collections of agents based on respective attributes of the agents within the plurality of collections of agents, and based on a requirement of the contact center;
instructions for selecting an agent to deliver the service, based on an evaluation of the agent, including selecting the agent from a collection of agents, the collection of agents included in the plurality of collections of agents;
instructions for evaluating the service delivered by the agent after the agent has delivered the service, in response to the request for service; and
instructions for updating the evaluation of the service of the agent.

13. The method of claim 1, further comprising:
wherein assessing at least one attribute associated with the customer comprises evaluating the customer, using speech recognition technology, to determine an emotional state of the customer; and
wherein selecting the agent to deliver the service includes selecting the agent based on the determined emotional state of the customer.

14. The method of claim 13, further comprising:
in response to receiving a modification to the requirement of the contact center, re-evaluating the agents according to the modification of the requirement and re-compiling the plurality of collections of agents based on the modification to the requirement of the contact center.

15. The method of claim 14, further comprising:
identifying a high call volume at the contact center;
modifying a policy of the contact center to reduce a call length evaluation attribute that represents good customer service; and
performing a new evaluation of the agents based on the modified policy.

16. The method of claim 15, further comprising:
wherein evaluating the service delivered by the agent after the agent has delivered the service, in response to the request for service, comprises evaluating a performance of the agent during delivery of the service;

prompting a manager to perform a review of the agent based on an assessment of the agent, including prompting the manager to listen-in on a particular agent's calls; and prompting the manager to participate in a future delivery of service by the agent at a frequency dependent on the assessment of the agent.

17. The method of claim 16, further comprising:

wherein evaluating the service delivered by the agent after the agent has delivered the service, in response to the request for service, comprises evaluating the service delivered by the agent based on at least one policy associated with the contact center;

receiving input from the manager that modifies the at least one policy associated with the contact center;

performing a new evaluation of the agent using the policy after the at least one policy has been modified; and receiving input from the manager that overrides the new evaluation of the agent.

18. The method of claim 6, further comprising:

wherein evaluating the service delivered by the agent after the agent has delivered the service, in response to the request for service, comprises evaluating the service delivered by the agent based on at least one policy associated with the contact center;

receiving input from the manager that modifies the at least one policy associated with the contact center;

performing a new evaluation of the agent using the policy after the at least one policy has been modified; and receiving input from the manager that overrides the new evaluation of the agent.

19. The method of claim 18, further comprising:

wherein assessing at least one attribute associated with the customer comprises evaluating the customer, using speech recognition technology, to determine an emotional state of the customer;

wherein selecting the agent to deliver the service includes selecting the agent based on the determined emotional state of the customer; and wherein receiving a request for the service comprises determining the service that satisfies the request from the customer.

20. The method of claim 8, further comprising:

wherein evaluating the service delivered by the agent after the agent has delivered the service, in response to the request for service comprises evaluating a performance of the agent during delivery of the service;

prompting a manager to perform a review of the agent based on an assessment of the agent including prompting the manager to listen in on a particular agent's calls; and prompting the manager to participate in a future delivery of service by the agent at a frequency dependent on the assessment of the agent.

21. The method of claim 20, further comprising:

wherein assessing at least one attribute associated with the customer comprises evaluating the customer, using speech recognition technology, to determine an emotional state of the customer; and wherein selecting the agent to deliver the service includes selecting the agent based on the determined emotional state of the customer.

\* \* \* \* \*